United States Patent Office 2,944,057
Patented July 5, 1960

2,944,057

PYRIMIDINE DERIVATIVES

Jerome Korman, Portage Township, Kalamazoo County, Mich., assignor to The Upjohn Company, Kalamazoo, Mich., a corporation of Michigan No Drawing. Filed Apr. 30, 1958, Ser. No. 731,867

5 Claims. (Cl. 260—256.5)

This invention relates to new compounds, 6-lower-carboxamido-4-hydroxypyrimidine-2-sulfonamides and to novel intermediates in the preparation thereof.

The novel compounds of the invention have the structural formula:

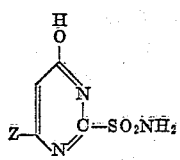

wherein Z is a lower-carboxamido group.

In the preparation of the novel compounds of the invention, a lower carboxamido-4-acetoxypyrimidine-2-thiol is first converted to the corresponding sulfenamide by oxidative condensation with an amide-forming nitrogen compound which can be carried out in one step [see Carr, Smith, and Alliger, J. Org. Chem. 14: 921–34 (1949); Tschunkur and Kohler, U.S. Patent 2,045,888; Ashworth, U.S. Patent 2,268,467; Carr, U.S. Patent 2,271,834; and Harman, U.S. Patents 2,191,656–7], or in two steps via an N-chloroamine [see Hanslick, U.S. Patent 2,261,024; British Patent 377,730; and Alliger, U.S. Patents 2,495,085 and 2,581,921], or in two steps via the disulfide [see Busch, Ber. 29: 2127 (1896); Tschunkur and Kohler, U.S. Patent 2,045,888]. The obtained sulfenamide is then treated with a strong oxidizing agent to convert it to the desired sulfonamide. The oxidizing agent, advantageously aqueous potassium permanganate, is added gradually with stirring and with cooling, if desired, advantageously to a solution of the sulfenamide in an inert solvent such as acetone, pyridine, dioxane, and like polar solvents such as commonly are used as media for permanganate oxidations. Other strong oxidizing agents of an alkaline character, that is, which are either effective in an alkaline solution or produce in the oxidation an alkaline component, can be used. Alkaline hydrogen peroxide and sodium peroxide, for example, could be used in place of potassium permanganate. Acidic oxidations using hydrogen peroxide in acetic acid, chromic acid, nitric acid, permanganic acid, and the like, can be used. The oxidizing agent advantageously can be dissolved in a solvent (water, for example, is suitable for potassium permanganate) and the solution slowly added to the sulfenamide solution. If the rate of addition is properly adjusted, excessive heating will be avoided. Ordinarily it will be sufficient if the rate of addition of the oxidizing agent is so correlated with the capacity of the apparatus to dissipate heat as to keep the temperature below the decomposition temperature for either the sulfenamide used or the sulfonamide produced in the reaction mixture, whichever is the lower. As this temperature will vary according to the decomposition temperature of the compounds involved, no hard and fast rule can be given, but, in general, it will be sufficient if the temperature is kept below about sixty degrees centigrade. Any lower reactive temperature can be used. At lower temperatures, however, the rate of reaction is reduced so that it is ordinarily desirable not to operate at temperatures below about minus five degrees centigrade. Ordinarily a temperature between about zero and about fifty degrees centigrade is suitable. When the reaction is complete, the desired sulfonamide, after acidification to free it from its salt, if such is formed, can then be recovered in any suitable manner, as by filtration, centrifugation, solvent extraction, or the like, and can, if desired, be purified by recrystallization from a solvent.

When ammonia is used the unsubstituted amide is obtained. By substituting methylamine for ammonia, the corresponding N-methyl sulfonamide is obtained. In the like manner, by substituting secondary amines and other primary amines in the above reactions, there are also obtained the corresponding N,N-dimethyl, N-n-butyl, N-isobutyl, N-sec-butyl, N-tert-butyl, N,N-diisopropyl, N-methyl-N-ethyl, N-2-aminoethyl, N-(2-ethylhexyl), N-cyclohexyl, N-methyl-N-cyclohexyl, N-2-methylcyclohexyl, N-cyclophenyl, and like N-mono- and N-di-lower-alkyl and cycloalkyl sulfonamides; N-2-pyridyl, N-2-thiazolyl, N-2-pyrimidyl, and like N-heterocyclic sulfonamides; and N-phenyl, N-methyl-N-phenyl, N-2-thienyl, N-thenyl, N-2-furyl, N-furfuryl, N-tolyl, N-benzyl, N-phenethyl, and like N-aryl and N-aralkyl sulfonamides. Also by substituting the ammonia by a heterocyclic secondary amine such as piperidine, pyrrolidine, piperazine, N-methylpiperazine, morpholine, and the like, as well as the lower-alkyl derivatives thereof, such as 2-methylpiperidine, 2,2-dimethylpyrrolidine, and the like, there are obtained the corresponding sulfonamides in which the amide nitrogen is comprised in a heterocycle. Thus the —NH₂ group in the above formulas can be replaced by the group —NR'R" in which R' and R", representatively, are hydrogen, lower-alkyl, lower-cycloalkyl, lower-aryl, or lower-aralkyl, and together a lower-alkylene, lower-oxalkylene, or lower-azalkylene radical forming with the nitrogen a five to six membered heterocyclic ring.

The invention may be more fully understood by reference to the following examples which are illustrative only and not intended to be limiting.

Example 1

A. *6-acetamido-4-acetoxypyrimidine-2-thiol*

A mixture of 2.0 grams (0.011 mole) of 6-amino-4-hydroxypyrimidine-2-thiol [Traube, Ann. 331: 64 (1904)], ten milliliters of dry pyridine, and ten milliliters of acetic anhydride was allowed to stand at room temperature overnight. The mixture was poured into cold water and the resulting solid was recovered by filtration, washed with water, and dried. There was obtained 1.63 grams of 6-acetamido-4-acetoxypyrimidine-2-thiol melting at 228–237 degrees centigrade. A sample recrystallized from 95 percent ethyl alcohol melted at 233–236 degrees centigrade.

B. *6-acetamido-4-hydroxypyrimidine-2-sulfenamide*

A solution of 20.0 grams (0.092 mole) of 6-acetamido-4-acetoxypyrimidine-2-thiol and four grams of sodium hydroxide in 150 milliliters of water, and 75 milliliters of a ten percent aqueous solution of sodium hypochlorite, were added dropwise simultaneously to 300 milliters of concentrated ammonium hydroxide which was stirred and cooled to zero degrees centigrade. Concentrated hydrochloric acid was added to the cold solution until neutral and the resulting solid material was recovered by filtration, washed with water, and dried at room temperature. There was obtained 16.5 grams of 6-acetamido-4-hydroxypyrimidine-2-sulfenamide melting above 250 degrees centigrade with decomposition. Hydrolysis of O-acetyl group had occurred.

C. 6-acetamido-4-hydroxypyrimidine-2-sulfonamide

A solution of 5.0 grams (0.025 mole) of the above sulfenamide in 100 milliliters of two percent aqueous sodium hydroxide was treated dropwise at room temperature with an aqueous solution of five grams of sodium permanganate in 100 milliliters of water. The temperature rose slowly to 33 degrees centigrade. The reaction mixture was filtered, concentrated under reduced pressure, acidified with concentrated hydrochloric acid, and the precipitated 6-acetamido-4-hydroxypyrimidine - 2 - sulfonamide separated on a filter.

Other 6-carboxamido - 4 - hydroxypyrimidine sulfenamides and sulfonamides can similarly be produced by replacing the acetic anhydride with the appropriate acid anhydride or acid chloride. Thus by using propionic anhydride, valeric anhydride, capyrylic anhydride, benzoic anhydride, or the corresponding acid chlorides, there are obtained 6-propionamido-, 6-valeramido-, 6-caprylamido-, 6-benzamido-4-hydroxypyrimidine-2-sulfenamides and sulfonamides.

The sulfonamides produced according to this example are useful as carbonic anhydrase inhibitors, as diuretics, as growth regulants, and as antibacterial agents.

This application is a continuation-in-part of applications Serial No. 462,113, filed October 13, 1954 (U.S. Patent 2,868,800) and Serial No. 723,136, filed March 24, 1958, now adbandoned.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. 6-acetamido-4-hydroxypyrimidine-2-sulfonamide.
2. 6-acetamido-4-hydroxypyrimidine-2-sulfenamide.
3. The compound having the formula:

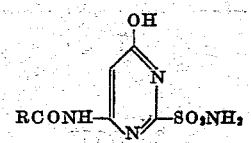

wherein R represents lower-alkyl.

4. The compound having the formula:

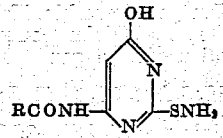

wherein R represents lower-alkyl.

5. The compound having the formula:

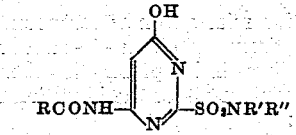

wherein R represents lower-alkyl, and R′ and R″ taken individually are selected from the class consisting of hydrogen, lower-alkyl, cycloalkyl from 5 to 6 ring carbon atoms, inclusive, aralkyl from 7 to 8 carbon atoms, inclusive, and aryl from 6 to 7 carbon atoms, inclusive, and R′ and R″ taken together with —N< are selected from the class consisting of pyrrolidino, piperidino, piperazino, morpholino, 2,2-dimethylpyrrolidino, 2-methylpiperidino, and N-methylpiperazino.

References Cited in the file of this patent

Greenbaum: Jour. Amer. Chem. Soc., vol. 76, pp. 6052–6054 (1954).